US009329049B2

(12) United States Patent
Edwards et al.

(10) Patent No.: US 9,329,049 B2
(45) Date of Patent: May 3, 2016

(54) VEHICLE TELEMATICS COMMUNICATIONS FOR PROVIDING DIRECTIONS TO A VEHICLE SERVICE FACILITY

(75) Inventors: Ryan M. Edwards, Macomb, MI (US); James J. Kelly, III, Ferndale, MI (US); Heather C. Michalak, Macomb, MI (US)

(73) Assignee: General Motors LLC, Detroit, MI (US)

( * ) Notice: Subject to any disclaimer, the term of this patent is extended or adjusted under 35 U.S.C. 154(b) by 289 days.

(21) Appl. No.: 13/530,646

(22) Filed: Jun. 22, 2012

(65) Prior Publication Data
US 2013/0046432 A1 Feb. 21, 2013

Related U.S. Application Data

(63) Continuation-in-part of application No. 12/640,810, filed on Dec. 17, 2009, and a continuation-in-part of application No. 12/944,232, filed on Nov. 11, 2010.

(51) Int. Cl.
G01C 21/26 (2006.01)
G01C 21/36 (2006.01)
G07C 5/00 (2006.01)
G08G 1/0962 (2006.01)

(52) U.S. Cl.
CPC ............ G01C 21/3605 (2013.01); G07C 5/008 (2013.01); G08G 1/0962 (2013.01)

(58) Field of Classification Search
CPC ......... G07C 5/006; G07C 5/008; H04W 4/06; H04W 4/12; H04W 4/14; H04W 4/18; H04W 68/00
See application file for complete search history.

(56) References Cited

U.S. PATENT DOCUMENTS

| | | | | |
|---|---|---|---|---|
| 5,006,829 A * | 4/1991 | Miyamoto et al. | ............ | 340/459 |
| 5,705,977 A * | 1/1998 | Jones | ............ | 340/457.2 |
| 5,819,201 A * | 10/1998 | DeGraaf | ............ | 701/29.4 |
| 6,131,060 A * | 10/2000 | Obradovich et al. | ............ | 701/49 |
| 6,359,570 B1 * | 3/2002 | Adcox et al. | ............ | 340/902 |
| 6,429,773 B1 * | 8/2002 | Schuyler | ............ | 340/425.5 |
| 6,927,682 B1 * | 8/2005 | Touhey et al. | ............ | 340/457.4 |
| 7,024,291 B2 * | 4/2006 | Sudou | ............ | 701/29.3 |
| 7,266,434 B2 * | 9/2007 | Mc Cullough et al. | ............ | 701/36 |
| 7,269,482 B1 * | 9/2007 | Shultz et al. | ............ | 701/1 |
| 7,333,881 B2 * | 2/2008 | Binderberger | ............ | 701/29.4 |
| 7,449,995 B1 * | 11/2008 | Clanton-Holloway | ............ | 340/438 |
| 7,532,962 B1 * | 5/2009 | Lowrey et al. | ............ | 701/32.3 |
| 7,545,262 B2 * | 6/2009 | Batchik | ............ | 340/438 |
| 7,715,961 B1 * | 5/2010 | Kargupta | ............ | 701/29.3 |
| 7,747,365 B1 * | 6/2010 | Lowrey et al. | ............ | 701/31.4 |
| 7,778,752 B1 * | 8/2010 | Hunt et al. | ............ | 701/36 |
| 7,809,481 B2 * | 10/2010 | Okada et al. | ............ | 701/31.4 |
| 7,904,219 B1 * | 3/2011 | Lowrey et al. | ............ | 701/32.3 |
| 8,032,296 B2 | 10/2011 | Bucchieri | | |
| 8,041,779 B2 * | 10/2011 | Habaguchi et al. | ............ | 709/219 |
| 8,082,076 B2 * | 12/2011 | Sells et al. | ............ | 701/31.6 |

(Continued)

Primary Examiner — Jonathan M Dager
(74) Attorney, Agent, or Firm — Anthony Luke Simon; Reising Ethington P.C.

(57) ABSTRACT

A method of providing directions to a vehicle service facility includes generating a vehicle service alert that includes vehicle operating data, sending the vehicle service alert to a vehicle telematics service subscriber, offering the vehicle telematics service subscriber a choice of one or more vehicle service facilities for responding to the vehicle service alert, and if the vehicle owner chooses a vehicle service facility, providing turn-by-turn directions to the chosen vehicle service facility.

20 Claims, 4 Drawing Sheets

(56) References Cited

U.S. PATENT DOCUMENTS

| | | | |
|---|---|---|---|
| 8,095,261 B2* | 1/2012 | Howell et al. | 701/29.1 |
| 8,306,560 B2* | 11/2012 | Krause et al. | 455/466 |
| 8,306,921 B2* | 11/2012 | Kalik et al. | 705/319 |
| 8,421,864 B2* | 4/2013 | Tano | 348/148 |
| 8,452,479 B2* | 5/2013 | Nath et al. | 701/29.4 |
| 8,718,862 B2* | 5/2014 | Gwozdek et al. | 701/29.9 |
| 8,886,389 B2* | 11/2014 | Edwards et al. | 701/29.1 |
| 9,002,554 B2* | 4/2015 | Chen | 701/22 |
| 2002/0049535 A1 | 4/2002 | Rigo et al. | |
| 2002/0091706 A1* | 7/2002 | Anderson et al. | 707/104.1 |
| 2003/0114965 A1* | 6/2003 | Fiechter et al. | 701/29 |
| 2003/0171964 A1 | 9/2003 | Center et al. | |
| 2004/0093134 A1* | 5/2004 | Barber et al. | 701/29 |
| 2004/0093155 A1* | 5/2004 | Simonds et al. | 701/200 |
| 2004/0203696 A1* | 10/2004 | Jijina et al. | 455/420 |
| 2004/0203974 A1* | 10/2004 | Seibel | 455/517 |
| 2004/0249532 A1* | 12/2004 | Kelly et al. | 701/30 |
| 2004/0259524 A1* | 12/2004 | Watkins et al. | 455/405 |
| 2005/0071356 A1* | 3/2005 | Wu | 707/100 |
| 2005/0137763 A1* | 6/2005 | Watkins et al. | 701/33 |
| 2005/0222754 A1 | 10/2005 | Meisler et al. | |
| 2006/0017565 A1* | 1/2006 | Addy | 340/539.14 |
| 2006/0089097 A1* | 4/2006 | Wang et al. | 455/3.02 |
| 2006/0212300 A1* | 9/2006 | Resser et al. | 705/1 |
| 2006/0229778 A1* | 10/2006 | Obradovich et al. | 701/33 |
| 2007/0043487 A1* | 2/2007 | Krzystofczyk et al. | 701/30 |
| 2007/0156311 A1* | 7/2007 | Elcock et al. | 701/29 |
| 2007/0167147 A1* | 7/2007 | Krasner et al. | 455/404.2 |
| 2007/0171029 A1* | 7/2007 | Inbarajan | 340/425.5 |
| 2007/0173992 A1* | 7/2007 | McCutchen et al. | 701/29 |
| 2007/0299565 A1* | 12/2007 | Oesterling | 701/1 |
| 2008/0004788 A1* | 1/2008 | Dorfstatter et al. | 701/117 |
| 2008/0021605 A1* | 1/2008 | Huber et al. | 701/30 |
| 2008/0021964 A1* | 1/2008 | Inbarajan | 709/206 |
| 2008/0027604 A1* | 1/2008 | Oesterling | 701/30 |
| 2008/0027605 A1* | 1/2008 | Oesterling | 701/33 |
| 2008/0027606 A1* | 1/2008 | Helm | 701/33 |
| 2008/0039995 A1* | 2/2008 | Reeser | 701/30 |
| 2008/0119980 A1* | 5/2008 | Ross et al. | 701/33 |
| 2009/0089134 A1* | 4/2009 | Uyeki | 705/9 |
| 2009/0106036 A1* | 4/2009 | Tamura et al. | 705/1 |
| 2009/0134991 A1* | 5/2009 | Shuart | 340/457 |
| 2009/0177351 A1* | 7/2009 | Watkins et al. | 701/30 |
| 2009/0286504 A1* | 11/2009 | Krasner et al. | 455/404.1 |
| 2010/0042498 A1* | 2/2010 | Schalk | 705/14.52 |
| 2010/0214428 A1* | 8/2010 | Wood et al. | 348/222.1 |
| 2011/0130958 A1* | 6/2011 | Stahl et al. | 701/201 |
| 2011/0166739 A1* | 7/2011 | Oesterling | 701/30 |
| 2011/0281562 A1* | 11/2011 | Videtich | 455/414.1 |
| 2012/0029759 A1* | 2/2012 | Suh et al. | 701/29 |
| 2012/0029964 A1* | 2/2012 | Tengler et al. | 705/7.19 |

* cited by examiner

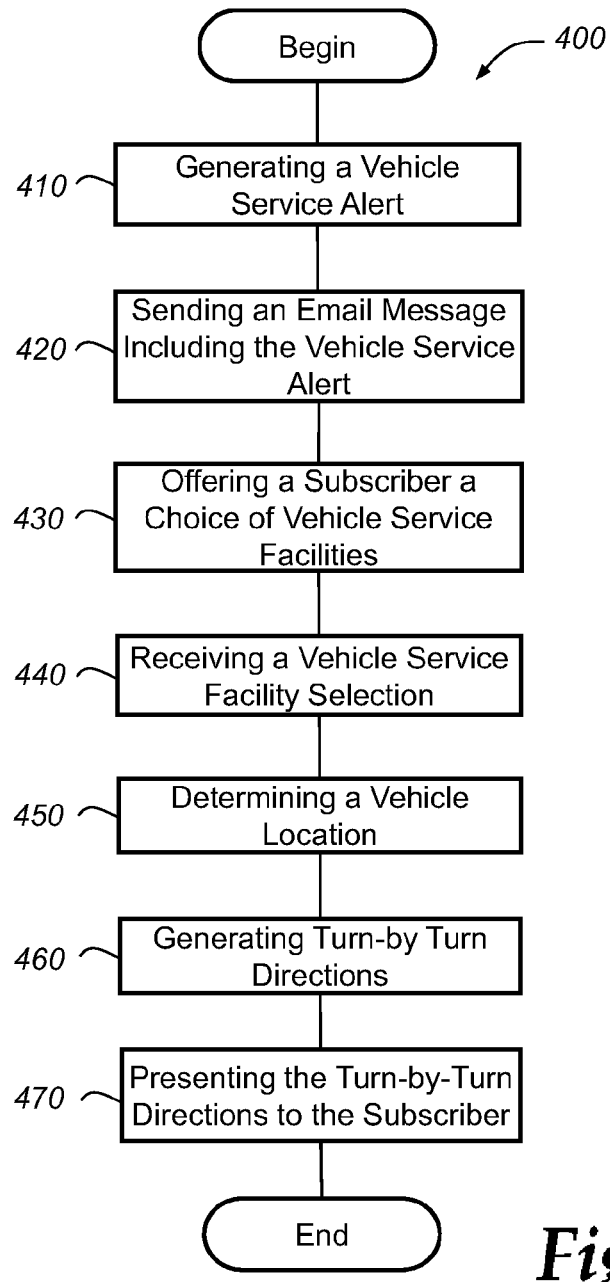

though not necessarily related to the vehicle itself. In addition to providing an in-vehicle reminder, the embodiments described below also can provide turn-by-turn directions from the vehicle to a vehicle service facility, such as a vehicle dealership, selected by the subscriber.

VEHICLE TELEMATICS COMMUNICATIONS FOR PROVIDING DIRECTIONS TO A VEHICLE SERVICE FACILITY

CROSS-REFERENCE TO RELATED APPLICATIONS

This application claims priority to U.S. application Ser. No. 12/640,810 filed on Dec. 17, 2009 and to U.S. application Ser. No. 12/944,232 filed on Nov. 11, 2010, the entire contents of which are hereby incorporated by reference.

TECHNICAL FIELD

The present invention generally relates to vehicle telematics systems and, more particularly, to techniques for providing in-vehicle reminders via a telematics unit and/or directions to a vehicle service facility.

BACKGROUND

Telematics units have been used with vehicles to provide a variety of services to subscribers of these services. For instance, a telematics service subscriber can receive customized GPS navigation directions, vehicle tracking in case of a theft, emergency services in case of air bag activation, unlocking of vehicle doors, slowing and disabling a vehicle by a law enforcement officer, etc. Also, various vehicle operating conditions can be monitored by a call center via the telematics device. For example, vehicle data such as diagnostic trouble codes (DTCs) can be reported to the call center. The DTCs can be analyzed and the result of that analysis may be reported to a vehicle owner or other authorized person. This report can include information concerning vehicle issues that the vehicle owner may remedy. The subscriber may receive a detailed diagnostic report of the vehicle issues through a service website or as an email describing the operating condition of the vehicle. This report may also suggest some urgent or preventive services needed.

SUMMARY OF THE INVENTION

According to an aspect of the invention, a method of providing directions to a vehicle service facility is given. The steps comprise generating a vehicle service alert that includes vehicle operating data, sending the vehicle service alert to a vehicle telematics service subscriber, offering the vehicle telematics service subscriber a choice of one or more vehicle service facilities for responding to the vehicle service alert, and if the vehicle owner chooses a vehicle service facility, providing turn-by-turn directions to the chosen vehicle service facility.

According to another aspect of the invention, a method of providing directions to a vehicle service facility is given. The steps comprise generating a vehicle service alert that includes vehicle operating data for a vehicle; sending the vehicle service alert to a vehicle telematics service subscriber; obtaining the location of the vehicle; determining whether the vehicle is covered by a vehicle warranty; if so, then offering the vehicle telematics service subscriber a choice of one or more vehicle dealerships for responding to the vehicle service alert; and after the vehicle telematics service subscriber chooses a vehicle dealership, providing turn-by-turn directions from the location of the vehicle to the chosen vehicle dealership; otherwise, offering the vehicle telematics service subscriber a choice of one or more aftermarket vehicle service providers in addition to one or more dealerships; and if the vehicle telematics service subscriber chooses either a vehicle dealership or an aftermarket vehicle service provider, then providing turn-by-turn directions from the location of the vehicle to the chosen dealership or aftermarket vehicle service provider.

According to yet another aspect of the invention, a method of providing directions to a vehicle service facility is given. The steps comprise sending a vehicle telematics service subscriber an email message that includes service alerts for a vehicle operated by the vehicle telematics service subscriber; offering the vehicle telematics service subscriber a choice of one or more vehicle service facilities capable of responding to each service alert included in the email based on the type of service alert; receiving from the vehicle telematics service subscriber a chosen selection from among the offered vehicle service facilities; determining the location of the vehicle operated by the vehicle telematics service subscriber; generating turn-by-turn directions between the location of the vehicle and the chosen selection; and presenting the turn-by-turn directions to the vehicle telematics service subscriber.

BRIEF DESCRIPTION OF THE DRAWINGS

Preferred exemplary embodiments of the invention will hereinafter be described in conjunction with the appended drawings, wherein like designations denote like elements, and wherein:

FIG. 4 is a flow chart for a method of providing directions to a vehicle service facility.

DETAILED DESCRIPTION OF THE PREFERRED EMBODIMENTS

Figure 1:
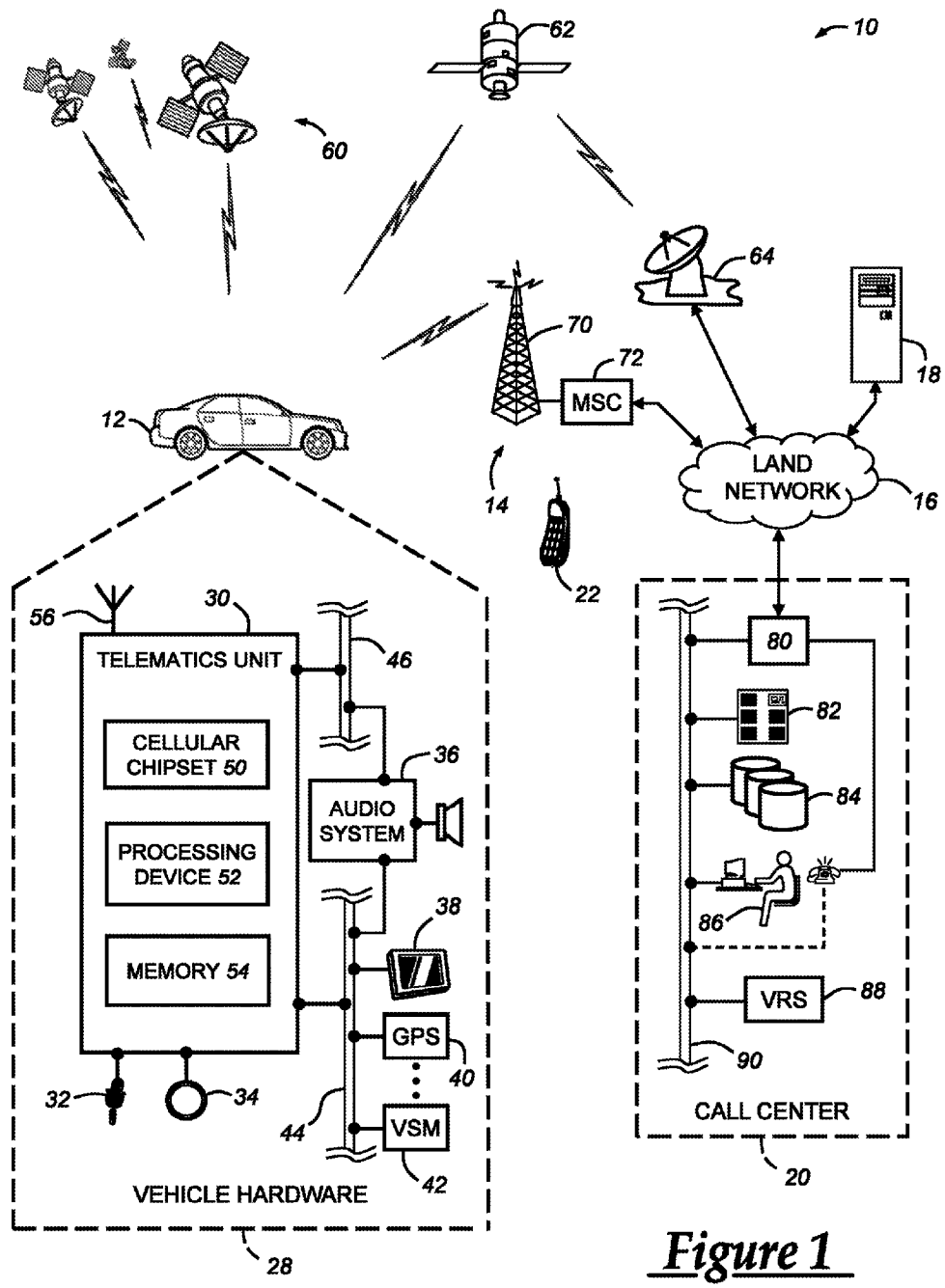
FIG. 1 is a block diagram depicting an exemplary embodiment of a communications system that is capable of using the method disclosed herein.

The system and methods described below are at least partially directed to different embodiments of an approach that enables a vehicle telematics service subscriber (such as a vehicle owner, user, or other authorized person) to set an in-vehicle reminder from a location remote of the vehicle itself. This can be helpful, for example, in instances in which the subscriber is not physically at the vehicle, but wishes to be reminded to take some action the next time he or she is present at the vehicle. For example, where the subscriber receives diagnostic information such as a check engine warning via email or other electronically-supplied communication on a computer, mobile phone, or other processing device at a location away from the vehicle, such that they are not able at that moment to utilize the vehicle telematics unit to call an advisor at the call center for information or help concerning the warning received. In such an instance, the embodiments described below enable the subscriber to set a reminder that, once they are again in the vehicle, will either automatically contact the call center or remind them of their desire to contact the call center for assistance concerning the diagnostic information received. Reminders for other service needs can also be set as well; for example, to renew or extend a subscription for telematics services or satellite radio services. As another example, the subscriber may wish to be reminded in the vehicle of some other action to be taken when in the vehicle that may not involve any communication with a call center; for example, a reminder to carry out a particular errand. To carry out these in-vehicle reminders, the disclosed methods enable a telematics central facility to provide the subscriber with a user-selectable reminder request option that is sent to the subscriber's cell phone, PDA, computer, or other processing device that the user can then select to setup a reminder trigger in their vehicle. If the user initiates the reminder request, it is sent to the call center which then establishes a data session between the call center and the vehicle telematics unit, sends a reminder trigger to the vehicle, and can then subsequently take an appropriate action upon occurrence of the trigger. This action can include presenting a reminder to the subscriber or other vehicle occupant, and/or initiating a telephone call with the call center via the telematics unit. During the call, the call center can provide additional information and other services to the driver.

The system and methods described below are also directed to different embodiments of an approach that enables a subscriber to identify vehicle service facilities capable of addressing vehicle service alerts. Given the location-determining capabilities of a telematics unit, a vehicle location can be determined with respect to identified vehicle service facilities. The identity and location of one or more of these vehicle service facilities can then be delivered to the vehicle telematics service subscriber and geographical directions between vehicle location (or other geographic point, such as an address) and any one of the vehicle service facilities can be provided to the subscriber. That is, the vehicle telematics service subscriber may receive a message, such as an email, that includes one or more service alerts for a vehicle. For each vehicle service alert, one or more nearby vehicle service facilities can be identified thereby providing the vehicle telematics service subscriber a means to address the alert.

Vehicle service facilities include vehicle dealerships as well as other service providers, such as gas stations or aftermarket vehicle service facilities. While some types of vehicle service alerts may benefit from vehicle dealership attention, other alerts can be quickly attended to by any one of a number of other service providers. Thus, the vehicle telematics service subscriber can be given one or more vehicle service facility options that may depend on the type of received service alert. For instance, the vehicle service alert may indicate that a vehicle suffers from engine trouble. It is possible that a limited number of vehicle service facilities, such as vehicle dealerships, may be competent or able to repair such trouble. In that case, one or more vehicle service facilities can be identified based on their ability to diagnose and/or repair engine troubles and the identity of those facilities can be provided to the vehicle telematics service subscriber.

On the other hand, the vehicle service alert could identify a tire inflated at a less-than-optimal pressure value. In that case, it may not be necessary or convenient for the vehicle telematics service subscriber to drive his vehicle to a dealership in order to satisfactorily inflate the vehicle's tires. While the vehicle telematics service subscriber could visit the dealership, it may be more convenient to obtain compressed air from an aftermarket vehicle service provider, such as a vehicle parts store, local/independent vehicle mechanic, or gas station. And along with the identified vehicle service facilities, driving directions to those facilities can also be provided. That way, the vehicle telematics service subscriber can receive the identities and locations of one or more service facilities that can fill vehicle tires with air (or provide other services depending on the alert) and proceed to the facility of his or her choice. Theoretically, the number of vehicle service facility options for providing compressed air may be more abundant than those that are capable of resolving engine trouble. So identifying the type of vehicle service alert can potentially increase the number of vehicle service facility options available to the vehicle telematics service subscriber. Given the one or more vehicle service facilities from which the vehicle telematics service subscriber can choose, the subscriber can select one and have driving directions or geographical directions provided based on that selection. Conveniently delivering these directions can make servicing the vehicle more likely and convenient.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live adviser or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Where the computer 18 is used by a subscriber or other user to access telematics services, it can be implemented using any suitable type of computer (e.g., a desktop computer or portable computer). In this regard, computer 18 is used as a processing device located remotely of the vehicle, even though as a portable computer it may occasionally be located at the vehicle.

Apart from computer 18, other types of remotely located processing devices can be used. For example, a mobile device 22 can be used and can be one of a number of such communication devices used by subscribers. Each mobile device 22 is a processing device that can be used for one or more purposes, such as voice communication, text messaging, email, web browsing, gaming, camera, video recording, sending and receiving photos and videos, audio player (e.g., MP3), radio, GPS navigation, personal organizer, to name but a few. In the illustrated embodiment, mobile device 22 is a mobile phone also known as a cell or cellular phone that connects to a cellular network such as system 14. In another embodiment, mobile device 22 can be a personal digital assistant (PDA) that may or may not provide telephony services. Various other types of suitable processing devices will be apparent to those skilled in the art.

Call center 20 is designed to provide the vehicle electronics 28 with a number of different system back-end functions and, according to the exemplary embodiment shown here, generally includes one or more switches 80, servers 82, databases 84, live advisers 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live adviser phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live adviser 86, it will be appreciated that the call center can instead utilize VRS 88 as an automated adviser or, a combination of VRS 88 and the live adviser 86 can be used.

Figure 2:
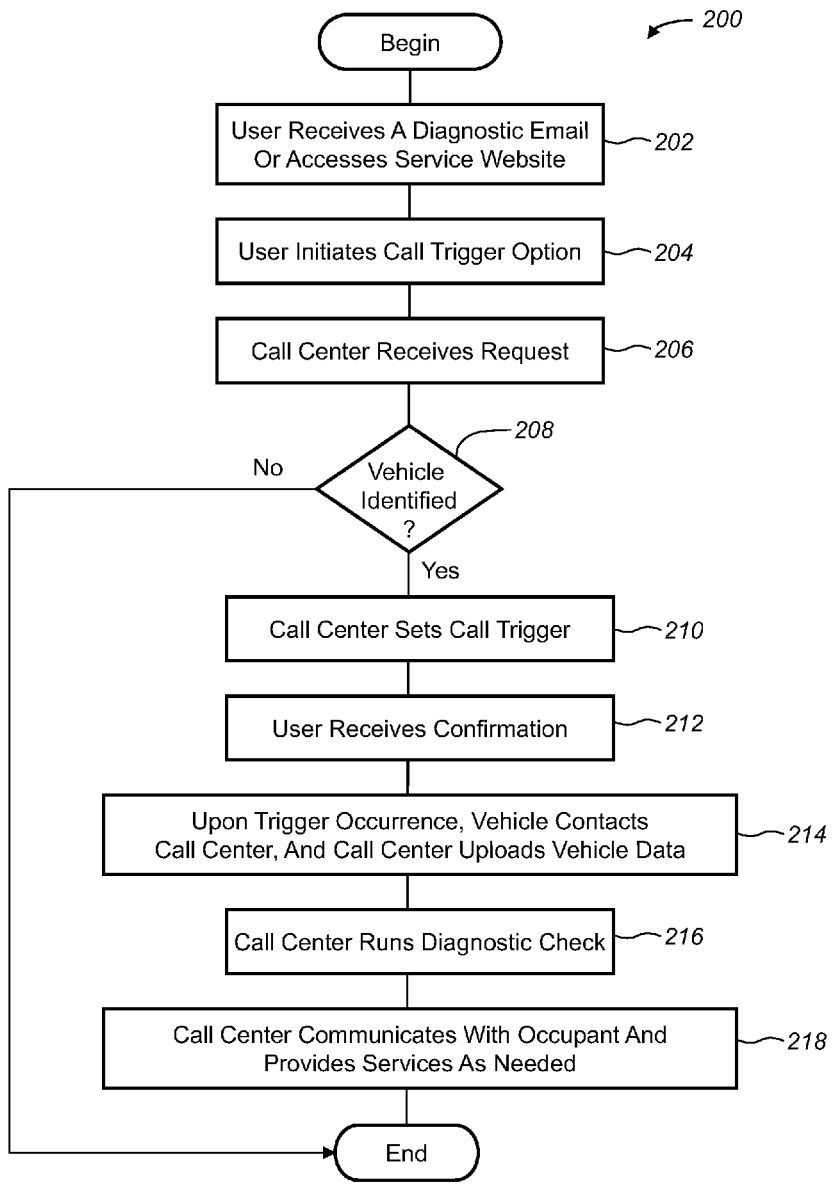
FIG. 2 is a flowchart depicting one embodiment of a method of providing an in-vehicle reminder via a vehicle telematics unit.

Turning now to FIG. 2, there is shown a method 200 for providing a reminder to a vehicle telematics service subscriber associated with a vehicle via a vehicle telematics unit. The subscriber is a person or entity who either has legal title to the vehicle (e.g., a purchaser, corporation, parent) or has possession of the vehicle for regular use (e.g., a lessee, employee driving a company car, licensed minor), or both (e.g., a purchaser driver), and who has opted to receive vehicle information from a telematics service. The method starts at step 202 and begins by providing a communication to the subscriber that contains an option for the subscriber to request an in-vehicle reminder. This communication is provided via a processing device located remotely of the vehicle. The communication can be an email or other electronic message sent to the subscriber, or a web page or other digital content sent in response to a request sent via a processing device, such as computer 18 or mobile device 22. Thus, for example, if the subscriber accesses a telematics service provider website (e.g., call center 20) via computer 18 or mobile device 22 (e.g., via a web browser) it can return to the subscriber a web page that includes the option of requesting an in-vehicle reminder. Or, for example, where the subscriber receives a diagnostic email through computer 18 or mobile device 22 from call center 20, the email can include this option to set the reminder. Where a diagnostic email is used to send the vehicle diagnostic information, it can be implemented as described in U.S. Patent Application Publication No. 2007/0173992 filed Dec. 29, 2006 and titled Vehicle Email Notification System an Method, the entire contents of which are hereby incorporated by reference. A diagnostic email comprises specific or general information concerning a monitored vehicle component, system, or operating condition. Specific information may be, for example, the amount of oil life remaining, whereas a general information may be, for example, a graphical indicator that indicates whether some action is required to address one or more vehicle conditions and possibly the importance or severity of the vehicle condition.

Whether provided by email, website access or otherwise, the subscriber is given the option of requesting a reminder in the vehicle. Thus, in step 204, the user can select this option by clicking on link or button, or by utilizing any other suitable means provided to initiate the call trigger request. Thus, in any embodiment, such as where a diagnostic email or service website is used, a link can be included which is then used to initiate a call trigger request to remind the subscriber that they wish to contact the call center concerning the diagnostic information received. The link, button, drop-down menu, etc. can be implemented using any suitable programming or scripting language (e.g., HTML, XHTML, SGML, JHTML, JavaScript, etc.). In addition, the link could trigger an email to be sent to call center 20. The link may be preceded by a description and/or instructions on how to initiate the call trigger option. For instance, in one embodiment, a "Click here to initiate a reminder call" statement can precede the link. In another embodiment, a drop-down menu or list can include "Reminder Call" option and just below it "Do Not Call" option where the user may select either option. These options can also permit the user to identify one or more maintenance or telematics service issues to which the reminder is to relate, and that information is sent to the call center as a part of the request.

In another embodiment, selection of the reminder option by the subscriber can be implemented by using a button displayed on the processing device that mimics the pushbutton 34. Thus, for example, the pushbutton 34 installed in the vehicle can be used to permit the subscriber to press the pushbutton 34 to obtain various telematics services, as described above, including, for example, placing a data or voice communication to the call center 20 for these services. This pushbutton 34 can have visual features that make it easily identifiable, such as certain color(s), graphics, and/or text printed on the face of the pushbutton. The button displayed on the processing device can be a virtual button that mimics the physical button 34 from the vehicle by including the same or similar color(s), graphics, or text such that the general function of the displayed virtual button is easily recognizable by the subscriber. Then, by allowing the subscriber to select this virtual button on the processing device, the associated programming can be used to send the reminder request to the call center 20 or elsewhere. Thus, this virtual button and its associated functionality can be included in the communication sent to the subscriber (e.g., in a diagnostic email or returned web page). As discussed above, apart from directly sending a reminder request to the call center 20 in response to the selection of the virtual button by the subscriber, there can also be provided a drop-down menu or other option display presented to the user to enable them to make different choices. These choices can include the means by which the reminder is carried out, such as by immediately placing a call the call center 20 via the processing device, or by carrying out some action the next time the subscriber is in the vehicle; for example, by presenting a visual or audible in-vehicle reminder to the subscriber, or placing an automatic in-vehicle call to the call center 20. These choices can also permit the user to associate the reminder with one or more types of services or vehicle maintenance or operational issues, and this can be done, for example, using a list of selectable items that permits the user to select one or more of the items by, for example, a check box or radio button displayed next to each item.

In step 206, call center 20 receives the reminder (or trigger) request. As noted above, this request can include a code or other information associating the reminder with a particular vehicle maintenance issue (e.g., scheduled oil change, check tire pressure, etc.) or telematics service issue (e.g., renew a telematics or cellular service subscription). Where the in-vehicle reminder was initiated via a diagnostic email, some or all of the vehicle information (VIN, mileage diagnostic results, services to be performed, etc.) can be automatically received with the call reminder request. In other embodiments, subscriber information can be obtained in other ways, such as by having the subscriber log into a secure account associated with the vehicle 12. The information received can be any information sufficient for call center 20 to identify vehicle 12. Later, in step 208, call center 20 verifies the vehicle identification data and service subscription data. If the verification is unsuccessful then the method can ends or call center 20 may send a reply consisting of an email, a text message, web page, or other communication. The reply may include a request to contact call center 20 because the subscriber information could not be verified, subscriber subscription has been expired, or for any other reason. In case the verification is successful, the method proceeds to the next step.

In step 210, call center 20 sets the reminder trigger. In the embodiment of FIG. 2, this trigger will be used to initiate a call to the call center 20 under circumstances in which a person is determined to be at the vehicle 12 and thus, likely to be available for communicating with the call center 20. In one embodiment, setting the trigger can be achieved by sending a telematics command to enable a code number already preprogrammed in the vehicle 12 which corresponds to the reminder call option. In a second embodiment, an entire command may be sent to the telematics unit 30 or some other VSM 42 to program the vehicle to perform a reminder call option. The trigger may wait for a series of events (e.g., vehicle ignition is turned on and all doors are closed, etc.) or just an event (e.g., vehicle ignition is turned on). However, the method preferably uses a trigger that is responsive to vehicle operation by an operator. Furthermore, this trigger can be implemented in a variety of different ways. For instance, an ignition trigger that occurs upon the vehicle ignition being activated can be used. In another instance, a mileage trigger that occurs after a certain number of miles has elapsed can be used. Other such triggers will become apparent to those skilled in the art.

Once the call center 20 sets the trigger, then it sends a confirmation to the service subscriber. Call center 20 may send a confirmation consisting of an email (e.g., if the request has been sent through an email), a text message (e.g., if the request has been sent through a cell phone, PDA, etc.), a web page (e.g., if the request has been sent through a service website), a preferred method desired by the subscriber and requested while subscribing to the telematics service or at a later time, etc. or a combination of any of these. The confirmation message may confirm that the call reminder option has been activated in the vehicle. In addition, the confirmation message may provide some contact information of the call center 20 if there is a need to contact the call center. The contact information may include phone number, email address, email link, or any other suitable contact method.

Upon a trigger condition occurrence, vehicle 12 can take a variety of actions. In one embodiment, the telematics unit 30 initiates a call to the call center 20 which will upload the vehicle data (step 214). This involves the telematics unit 30 automatically placing a call to the call center 20 upon occurrence of the trigger, followed by the call center 20 uploading vehicle data. Vehicle data is data related to a particular vehicle, which may include vehicle 12 identification number, mileage, GPS coordinates, subscriber name, account number, and driver license, etc. In another embodiment, the vehicle presents a reminder to the occupant, such as by displaying a text reminder or playing an audible reminder. The audible reminder can either be a general reminder message or something specific that is associated with the particular maintenance or telematics service issue originally identified in the reminder request sent to the call center. The audible message can be one that is downloaded from the call center or elsewhere at the time of presentation to the occupant, or can be pre-stored at the vehicle.

Where diagnostic data is uploaded, then at step 216, the call center 20 runs an optional diagnostic check to receive the current condition of vehicle 12. In one embodiment, call center 20 sends a command through telematics unit 30 to VSM 42 to run a diagnostic check at the vehicle. The check may include obtaining any diagnostic trouble codes, remaining oil life, etc. Later, VSM 42 sent the diagnostic check results to call center 20 through telematics unit 30. Then, call center 20 processes the results in order to communicate them to vehicle 12 occupant.

At step 218, call center 20 communicates with vehicle 12 occupant and provides services as needed. Advisor 86 communicates with the occupant over the call initiated by the vehicle per step 214. Advisor 86 may inform the occupant about the vehicle 12 current condition and/or any recommendation to service vehicle 12. Later, advisor 86 can additionally provide services as needed, such as renewal of a cellular telephone or satellite radio subscription. Other possible services include providing a list of service dealers to the occupant, setting up an appointment for the vehicle occupant to service the vehicle 12 at a service dealer, connecting the occupant with a desired service dealer advisor, etc. In one embodiment, call center 20 sends an email with the vehicle information and desired appointment time to a service dealer and request from the service dealer advisor to contact the occupant. In a second embodiment, call center 20 places the occupant on hold while making a phone call to a service dealer during which an appointment will be setup for the occupant. In a third embodiment, call center 20 places the occupant call on hold, makes a phone call to a service dealer and connects the occupant and the service dealer calls together. Of course, these are only some of embodiments possible since others will be apparent to those skilled in the art. The process ends at this step.

Figure 3:
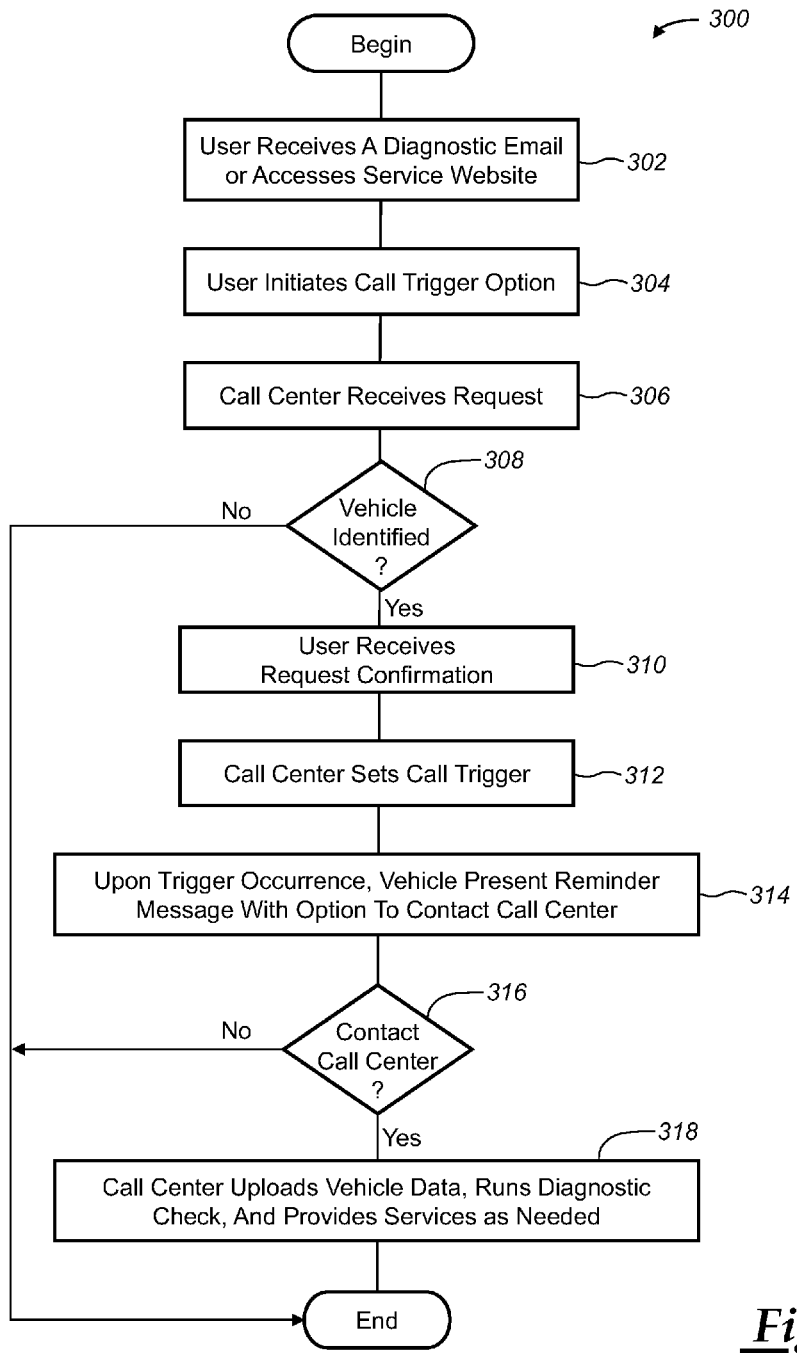
FIG. 3 is a flowchart showing a second embodiment of a method of providing an in-vehicle reminder via a vehicle telematics unit.

Turning now to FIG. 3, a second embodiment will be described. The portions of this embodiment in common with or similar to that of FIG. 2 can be carried out as described above. This embodiment differs from that of FIG. 2 in that the user receives a confirmation to the reminder call request once the vehicle has been identified, rather than waiting until later when the call center actually sets the call trigger in the vehicle. Another difference between both embodiments is that the vehicle presents a reminder message with an option to contact call center 20, rather than initiating a phone call by the vehicle to the call center 20 upon trigger occurrence as described in the first embodiment. Hence, in the second embodiment, the occupant has the option to either contact or not to contact the call center 20 upon occurrence of trigger and presentation of the reminder message. In yet other embodiments, as noted above, no call need be placed, but rather the reminder can be presented in the vehicle to the occupant without contacting the call center.

The method 300 begins in step 302 where the user receives a diagnostic email or accesses a service website. Then, the user initiates a reminder call trigger option at step 304. At step 306, the call center 20 receives the reminder call request along with vehicle 12 identification data. Later, the vehicle 12 can be either identified or not (step 308). In case it is not identified the process ends. However, in case it is identified then the user receives a confirmation for the requested reminder call immediately (step 310). Later, the call center 20 sets the call trigger in the vehicle 12 through telematics unit 30 (step 312). These steps can be implemented as discussed above in connection with FIG. 2.

Upon trigger occurrence, vehicle 12 presents a reminder message with an option to contact the call center 20 (step 314). The implementation and presentation of the reminder message can be processed in a variety of ways. For instance, the message can be pre-stored at the vehicle 12 (e.g., such as during manufacturing or initial setup of the vehicle or its telematics unit) before presentation to the occupant. In another instance, the message can be downloaded over a dedicated call following occurrence of trigger. Therefore, the presentation of the message can be implemented by either contacting the call center 20 to retrieve the message or without the need for contacting the call center 20 to retrieve it. Furthermore, the message presentation may take a variety of forms. For example, the message presentation may be an audible message played within the vehicle 12 using audio system 36, or a graphic one displayed on a visual display 38, or any other combinations. The message can include a request to place a call to the call center 20 to speak to an advisor, a request to hold to speak to an advisor, or any other requests. In one embodiment, the message requests that the occupant contact the call center 20, for example, by a manually initiated return call which the occupant can initiate by pressing button 34, providing a voice command via microphone 32, or using mobile device 22 to contact the call center. This provides the occupant with the ability to decide whether or not they wish to contact the call center 20 (step 316).

If the occupant decides not to contact the call center 20 then the process ends. In the event the occupant does contact the call center 20 then, if needed or helpful the telematics unit 30 can run a diagnostic check or data can be uploaded to the call center 20 where diagnostics can also be run, and an advisor at the call center 20 can then provide services to the driver (step 318) as discussed above with connection with FIG. 2. The process then ends.

Turning now to FIG. 4, there is shown a method 400 of providing directions to a vehicle service facility. The method 400 begins at step 410 by generating a vehicle service alert that includes vehicle operating data. A service alert, such as a diagnostic result or check, can be specific information concerning a monitored vehicle component, system, or operating condition. A specific diagnostic result could be, for example, the amount of oil life remaining (e.g., on a percentage basis 0-100%). Vehicle data, such as vehicle operating data, can be used to generate diagnostic results and include vehicle operational information that is generated by and/or obtained from the vehicle 12. Examples of vehicle data include tire pressure values, fuel levels, whether or not exterior vehicle lights are operational, or any type of DTC generated by the vehicle 12. The vehicle data can be transmitted to the call center 20 or service center computer via the wireless carrier system 14. This data can be collected after the occurrence of a trigger or can be requested at the vehicle 12 or the call center 20. At the call center 20 or service center computer, service alerts or diagnostic results can be generated using the vehicle data. Examples of diagnostic results and vehicle data—as well as email messages referred to below—can be found in U.S. Patent Application Publication No. 2007/0173992 referred to above. The method proceeds to step 420.

At step 420, a vehicle telematics service subscriber is sent an email message that includes service alerts for a vehicle 12 operated by the vehicle telematics service subscriber. An email message can include diverse types of dynamic vehicle information for the vehicle telematics service subscriber as is described in U.S. Patent Application Publication No. 2007/0173992. For instance, the email message can be formatted into a variety of regions, each involving a particular type of information. Those regions can include basic vehicle and introductory information, diagnostic information, maintenance information, a notification region (e.g. possible vehicle recalls, ancillary services, and vehicle telematics subscription information), and a miscellaneous section. At least one of the regions can include an identified type of vehicle service alert, such as tire pressure, oil change status, or other diagnostic result based on a DTC generated by the vehicle 12. The step of identifying or classifying vehicle service alerts can be carried out at the call center 20 or any other central facility. One or more of these regions can also include information that identifies the name of one or more vehicle service facilities. The method 400 proceeds to step 430.

At step 430, the vehicle telematics service subscriber is offered a choice of one or more vehicle service facilities capable of responding to each service alert included in the email message based on the type of alert. This can involve identifying one or more vehicle service facilities within a predetermined distance from the vehicle 12 or within a predetermined distance from a geographical address specified by the vehicle telematics service subscriber. For example, the call center 20 or other message-generating system, such as an electronic message generating system (EMGS), can identify the location of the vehicle 12 (or address) and identify the vehicle service facilities within a given range of that location (e.g. 30 miles). Vehicle service facilities can include vehicle dealerships and aftermarket vehicle service providers as described above, to name some examples. And each of these can be identified by and/or searched for using the type of services they provide and/or their location. It is possible to maintain a database at a central facility, such as call center 20, which can be accessed to identify both the vehicle service facilities and the type of service(s) they provide. In one example, the identity of a vehicle dealership can be saved using its name and location as well as a list of services that the dealership offers or is willing to provide. That dealership may be able to perform routine maintenance, such as oil changes, air filter replacement, spark plug replacement, tire service/rotations, or vehicle cleaning services. However, that dealership may also offer more complex services, such as advanced engine diagnosis and collision repair. So, each service offered by the dealership can be categorized and associated with a vehicle service alert when the identity of that dealership is saved in the database. For instance, this can mean identifying the type of vehicle alert, such as tire pressure, oil change, or an engine check DTC, and identifying one or more vehicle service facilities in the area capable of responding to the vehicle service alert. The step of identifying vehicle service alerts and/or vehicle service facilities can be carried out at the call center 20 or any other central facility.

When a vehicle 12 generates a particular vehicle service alert, it can be cross-referenced with the vehicle service alerts categorized or associated with the dealership to determine if that dealership (or other aftermarket vehicle service provider) would be able to assist with a particular vehicle service alert. On one hand, an aftermarket vehicle service provider, such as a gas station, may only offer compressed air that a vehicle telematics service subscriber can use to fill the vehicle's tires with air. In that case, the gas station can be categorized as only providing compressed air and when a vehicle generates a service alert associated with tire pressure, the gas station can be identified as a vehicle service facility able to offer assistance. On the other hand, if the vehicle service alert indicates that the vehicle 12 could benefit from an oil change, the gas station may not be offered to the vehicle telematics service subscriber as an available vehicle service facility because the gas station may not be categorized as having the ability to provide oil change services. As a result, the vehicle telematics service subscriber may only be offered vehicle service facilities that are able to perform the needed service(s).

It is possible that a minimum capability threshold can be established with respect to offering vehicle service facilities to the vehicle telematics service subscriber. This threshold can be optionally-selected to limit the type of offered vehicle service facility to facilities can remedy all of the vehicle service alerts contained in the email message. In one example, that means that method 400 may only offer vehicle service facilities that can service the most complex vehicle service alerts as well as the most minor that are included in the email message. For example, an email message can include one vehicle service alert recommending an oil change and another recommending the investigation of a check engine light. While a vehicle dealership may be able to both change the oil in the vehicle 12 and investigate the check engine light, a gas station may only be able to change the oil. So in order to prevent visiting more than one vehicle service facility, the vehicle telematics service subscriber may wish that the vehicle service facilities that are unable to remedy all of the vehicle service alerts not be offered.

It can be determined whether the vehicle 12 is covered by a vehicle warranty and if so, whether that warranty covers the type of vehicle service alert included in the email. In that case, it can be determined which vehicle service facilities within a predetermined area of the vehicle 12 honor that vehicle warranty and will remedy the vehicle service alert for free or for a reduced cost. The vehicle telematics service subscriber can then be offered only vehicle service facilities that honor the vehicle warranty. It is also possible to provide a description of the warranty coverage to the vehicle telematics service subscriber along with the vehicle service alert. Information indicating the type of warranty coverage for the vehicle 12 can be maintained at a central facility, such as a call center 20.

After identifying the service facilities nearby the vehicle 12 and their offered services, those facilities can be graphically displayed to the vehicle telematics service subscriber. This can involve presenting the name of one or more vehicle service facilities, their contact information, a map of their location, hours of operation, and/or other information the vehicle telematics service subscriber may find useful to locate/communicate with the vehicle service facilities on a graphical display. The graphical display can be located in the vehicle 12, such as visual display 38, or it can be located outside of the vehicle 12, such as a monitor in electrical communication with a personal computer, or it can be integrated with a portable wireless device, such as a the mobile device 22 or PDA—to name a few examples. It is possible that the name of each vehicle service facility or a graphical icon representing each vehicle service facility can appear as a hyperlink in the email message; upon clicking on or accessing that hyperlink the user can receive additional information about each vehicle service facility. The information that identifies the name of one or more vehicle service facilities can also include a graphical map and an indicator, such as a dot, that identifies the location of the vehicle service facility with respect to the surrounding area and/or the vehicle 12 or other specified address. The graphical map can also take the form of a street-view image representing the vehicle service facility. The method 400 proceeds to step 440.

At step 440, a chosen vehicle service facility selection is received from the vehicle telematics service subscriber. After receiving the offered vehicle service facilities in the message, the vehicle telematics service subscriber selects one that he or she would like to service the vehicle 12. This selection can be made by clicking a hyperlink embedded in the email. Upon selecting the vehicle service facility, that selection can be transmitted to the central facility (e.g. call center 20) which can prepare to provide driving directions to the vehicle telematics service subscriber. The method 400 proceeds to step 450.

At step 450, the location of the vehicle 12 operated by the vehicle telematics service subscriber is determined. The present location of the vehicle 12 can be verified by the call center 20. That way, an initial point from which driving directions will be determined can be identified. The initial point can be determined by receiving GPS coordinates from the vehicle 12 that are generated by the GPS module 40. These coordinates can be sent by the vehicle 12 over the wireless carrier system 14 as is known in the art. The method 400 proceeds to step 460.

At step 460, turn-by-turn directions between the location of the vehicle 12 and the chosen selection are generated. Given the location of the vehicle 12 and the location of the chosen vehicle service facility, turn-by-turn directions can be generated. These directions can be generated in any one of a number of ways. For instance, the turn-by-turn directions can be generated at the call center 20 and sent to the vehicle 12 over the wireless carrier system 14. That way, when the vehicle telematics service subscriber operates the vehicle 12, the turn-by-turn directions can be ready to direct the subscriber to the vehicle service facility. The turn-by-turn directions can be provided to the vehicle telematics unit 30, which can convey those directions to the vehicle telematics service subscriber using vehicle hardware described above. In another embodiment, the turn-by-turn directions can be provided to the vehicle telematics service subscriber located outside of the vehicle 12. In that case, step 450 can be optionally omitted and the call center 20 or other central facility can calculate turn-by-turn directions between a given address and the selected vehicle service facility without determining the location of the vehicle 12. The given address can be entered at the same time the vehicle service facility is selected or it can be accessed from a previously-saved profile created by the vehicle telematics service subscriber and saved at the call center 20. Although providing turn-by-turn directions to the vehicle telematics service subscriber outside of the vehicle has been described without performing step 450, it should also be appreciated that directions can be provided to the subscriber outside of the vehicle by including step 450. In that case, the call center 20 could determine the location of the vehicle 12 as described above, calculate the turn-by-turn directions based on that location, and send the directions to the vehicle telematics service subscriber in an electronic message, such as an email. This email can include text-based commands or instructions or could include a hyperlink that provides turn-by-turn directions from any one of a number of online/web-based map websites, such as Google™ maps. And the email can be received at a variety of places, such as a PDA or personal computer. The method 400 proceeds to step 200.

At step 470, the turn-by turn directions are presented to the vehicle telematics service subscriber. If presented in the vehicle 12, the turn-by-turn directions can be received by the vehicle telematics unit 30 and presented audibly through the vehicle audio system 36 and/or visually through vehicle display 38. It is also possible to send the turn-by-turn directions to the vehicle telematics service subscriber in an email or other electronic message. In those cases, the turn-by-turn directions can be a list of text-based commands or instructions that can be displayed on a processing device, such as a PDA or mobile phone, or printed on paper using an attached printer. That way, the vehicle telematics service subscriber can receive the turn-by-turn directions without using the vehicle telematics unit 30 and can portably carry those directions with him or her. The method 400 then ends.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of providing directions to a vehicle service facility, comprising the steps of:
   (a) identifying, for each of a number of vehicle service facilities, one or more services provided by the vehicle service facility;
   (b) associating each of the vehicle service facilities in a database with the one or more identified services provided by that vehicle service facility, wherein the database is associated with a central facility;
   (c) receiving from a vehicle telematics service subscriber an indication at the central facility of a desire to set a trigger at a vehicle associated with the subscriber, wherein the trigger is associated with a vehicle service alert generated by the vehicle;
   (d) based on step (c), remotely setting the trigger at the vehicle from the central facility;
   (e) when a trigger occurrence occurs at the vehicle, offering the vehicle telematics service subscriber a choice of a plurality of vehicle service facilities based on the trigger occurrence and the identified service(s) provided by the vehicle service facilities; and
   (f) if the vehicle telematics service subscriber chooses an offered vehicle service facility, providing turn-by-turn directions to the chosen vehicle service facility.

2. The method of claim 1, wherein step (e) further comprises the step of offering the one or more vehicle service facilities based on the type of vehicle service alert generated.

3. The method of claim 1, wherein the database is maintained at the central facility, wherein the central facility includes a call center.

4. The method of claim 1, further comprising the step of determining if a vehicle operated by the vehicle telematics service subscriber is covered by a warranty and, if so, offering a vehicle service facility to the vehicle telematics service subscriber that honors the warranty.

5. The method of claim 1, further comprising the step of limiting the number of offered vehicle service facilities based on the complexity of two or more generated vehicle service alerts by applying a minimum capability threshold.

6. The method of claim 1, wherein turn-by-turn directions are provided to the vehicle telematics service subscriber in an email message that includes vehicle diagnostic results.

7. The method of claim 1, wherein turn-by-turn directions are provided to the vehicle telematics service subscriber as a hyperlink in an email message.

8. The method of claim 1, wherein turn-by-turn directions are provided to the vehicle telematics service subscriber as text-based commands shown on a display in a vehicle or audibly recited in the vehicle.

9. The method of claim 1, wherein the turn-by-turn directions are included in an email as a geographical map.

10. A method of providing directions to a vehicle service facility, comprising the steps of:
    (a) generating a vehicle service alert that includes vehicle operating data for a vehicle;
    (b) sending the vehicle service alert to a vehicle telematics service subscriber;
    (c) obtaining the location of the vehicle;
    (d) determining whether the vehicle is covered by a vehicle warranty;
    (e) if so, then offering the vehicle telematics service subscriber a choice of one or more vehicle dealerships for responding to the vehicle service alert;
    (f) otherwise, offering the vehicle telematics service subscriber a choice of one or more aftermarket vehicle service providers in addition to one or more dealerships; and
    (g) after the vehicle telematics service subscriber chooses a vehicle dealership or aftermarket vehicle service provider, providing turn-by-turn directions from the location of the vehicle to the chosen vehicle dealership or aftermarket vehicle service provider.

11. The method of claim 10, wherein one or more vehicle dealerships or aftermarket vehicle service providers are offered based on the type of vehicle service alert generated.

12. The method of claim 10, further comprising the step of identifying one or more services provided by the vehicle dealership or aftermarket vehicle service provider and associating the dealership or aftermarket vehicle service provider in a database with the one or more identified services.

13. The method of claim 12, wherein the database is maintained at a call center.

14. The method of claim 10, wherein turn-by-turn directions are provided to the vehicle telematics service subscriber as a hyperlink in an email message.

15. The method of claim 10, wherein turn-by-turn directions are provided to the vehicle telematics service subscriber as text-based commands shown on a display in a vehicle or audibly recited in the vehicle.

16. The method of claim 10, wherein the turn-by-turn directions are included in an email as a geographical map.

17. A method of providing directions to a vehicle service facility, comprising the steps of:
    (a) sending a vehicle telematics service subscriber an email message that includes service alerts for a vehicle operated by the vehicle telematics service subscriber;
    (b) determining if the vehicle is covered by a warranty and, if so, offering the vehicle telematics service subscriber a choice of one or more vehicle service facilities that honor the warranty and are capable of responding to each service alert included in the email based on the type of service alert;
    (c) receiving from the vehicle telematics service subscriber a chosen selection from among the offered vehicle service facilities;
    (d) determining the location of the vehicle operated by the vehicle telematics service subscriber;
    (e) generating turn-by-turn directions between the location of the vehicle and the chosen selection; and
    (f) presenting the turn-by-turn directions to the vehicle telematics service subscriber.

18. The method of claim 17, further comprising the step of limiting the number of offered vehicle service facilities based on the complexity of two or more generated vehicle service alerts by applying a minimum capability threshold.

19. The method of claim 1, wherein step (e) further comprises automatically receiving at the central facility an indication of the trigger occurrence from the vehicle, wherein the indication of the trigger occurrence comprises a vehicle data upload.

20. The method of claim 1, wherein step (e) further comprises establishing communication between the central facility and the vehicle as a result of the vehicle providing a reminder to the vehicle telematics service subscriber, wherein the reminder is associated with the vehicle service alert.

* * * * *